United States Patent
Hong et al.

(10) Patent No.: US 8,733,998 B2
(45) Date of Patent: May 27, 2014

(54) DISPLAY DEVICE

(75) Inventors: Hyun-Seok Hong, Daejeon (KR);
Yo-Han Lee, Asan-si (KR); Su-Hag Ha, Incheon (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 546 days.

(21) Appl. No.: 12/547,615

(22) Filed: Aug. 26, 2009

(65) Prior Publication Data

US 2010/0053993 A1 Mar. 4, 2010

(30) Foreign Application Priority Data

Sep. 2, 2008 (KR) .......................... 10-2008-0086327

(51) Int. Cl.
*F21V 7/04* (2006.01)

(52) U.S. Cl.
USPC .......................................... 362/612; 362/276

(58) Field of Classification Search
USPC ........................ 362/97.1–97.4, 276, 600–634; 349/61–69
See application file for complete search history.

(56) References Cited

U.S. PATENT DOCUMENTS

| | | | | |
|---|---|---|---|---|
| 2007/0222741 | A1* | 9/2007 | Itaya | 345/102 |
| 2007/0290985 | A1* | 12/2007 | Matsumoto et al. | 345/102 |
| 2008/0198297 | A1* | 8/2008 | Choi et al. | 349/65 |

FOREIGN PATENT DOCUMENTS

| | | |
|---|---|---|
| CN | 101042499 | 9/2007 |
| JP | 2006-292833 | 10/2006 |
| KR | 1020070072188 | 7/2007 |
| KR | 1020080016281 | 2/2008 |

OTHER PUBLICATIONS

Chinese Office action dated Feb. 5, 2013, with English translation.
Japanese Office Action Dated Oct. 8, 2013.

* cited by examiner

*Primary Examiner* — Jason Moon Han
(74) *Attorney, Agent, or Firm* — F. Chau & Associates, LLC

(57) ABSTRACT

A display device is provided, which can precisely control a light source by measuring the quantity of light from the light source under uniform conditions. The display device includes a display panel displaying an image, a light source generating light, a light guide plate guiding and providing the light to the display panel, a receptacle accommodating the light source and the light guide plate, an optical sensor fixed to the receptacle to sense the light, a light receiving hole formed at an edge of the receptacle to provide a path through which the light reaches the optical sensor, and an optical adjustment member interposed between the light guide plate and the optical sensor to reduce luminance of the light incident to the optical sensor. The optical sensor is completely exposed to the optical adjustment member through the light receiving hole.

14 Claims, 13 Drawing Sheets

DISPLAY DEVICE

CROSS-REFERENCE TO RELATED APPLICATION

This application claims priority from Korean Patent Application No. 10-2008-0086327, filed on Sep. 2, 2008, in the Korean Intellectual Property Office, the disclosure of which is incorporated by reference herein in its entirety.

BACKGROUND OF THE INVENTION

1. Technical Field

The present invention relates to a display device, and more particularly to a display device that can precisely control a light source by measuring the quantity of light from the light source under uniform conditions.

2. Discussion of Related Art

A liquid crystal display (LCD), which is one of the most widely used types of flat panel displays (FPDs), includes two substrates, on which electrodes are formed, and a liquid crystal layer interposed between the two substrates. In such a liquid crystal display, an image is displayed when liquid crystal molecules of the liquid crystal layer are rearranged in accordance with voltages being applied to the electrodes, and thus the quantity of light passing through the liquid crystal layer is adjusted.

In order to improve the display quality, a display device, which adjusts the luminance of light provided from a light source in accordance with an image being displayed on a display panel, has been developed. Such a display device can adjust the luminance of the light source by measuring the luminance of light provided from the light source and feeding back the measured luminance value.

The display device may include an optical sensor measuring the luminance of light, and in order to accurately measure the luminance of the light source, the optical sensor should measure the light under uniform conditions. However, if external conditions of the display device are changed, the measurement conditions of the optical sensor are also changed, and an error may occur in the measured value. For example, if the display device is thermally deformed due to a change of an external temperature, a change may occur in a relative position between a constituent element, such as, for example, a light receiving hole, and the optical sensor. The change in the relative position between the constituent element, such as the light receiving hole, and the optical sensor causes a difference in the quantity of light incident to the optical sensor, and thus a measurement error may occur.

Accordingly, there is a need for a structure capable of measuring the light under uniform conditions even if the external conditions are changed.

SUMMARY OF THE INVENTION

Embodiments of the present invention provide a display device that can precisely control a light source by measuring the quantity of light from the light source under uniform conditions.

A display device, according to an embodiment of the present invention, includes a display panel displaying an image, a light source generating light, a light guide plate guiding and providing the light to the display panel, a receptacle accommodating the light source and the light guide plate, an optical sensor fixed to the receptacle to sense the light, a light receiving hole formed in the receptacle to provide a path through which the light reaches the optical sensor; and an optical adjustment member interposed between the light guide plate and the optical sensor to reduce luminance of the light incident to the optical sensor; wherein the optical sensor is completely exposed to the optical adjustment member through the light receiving hole.

A display device, according to an embodiment of the present invention, includes a display panel, a light source, a light guide plate, a frame surrounding at least part of the light guide plate, an optical sensor positioned in a groove formed in the frame, a light receiving hole formed in the frame, wherein the light receiving hole provides a path through which light from the light guide plate reaches the optical sensor, and an optical adjustment member interposed between the light guide plate and the optical sensor, wherein the optical sensor is exposed to the optical adjustment member through the light receiving hole.

BRIEF DESCRIPTION OF THE DRAWINGS

Embodiments of the present invention will be more apparent from the following detailed description taken in conjunction with the accompanying drawings, in which.

DETAILED DESCRIPTION OF THE EXEMPLARY EMBODIMENTS

Figure 1A:
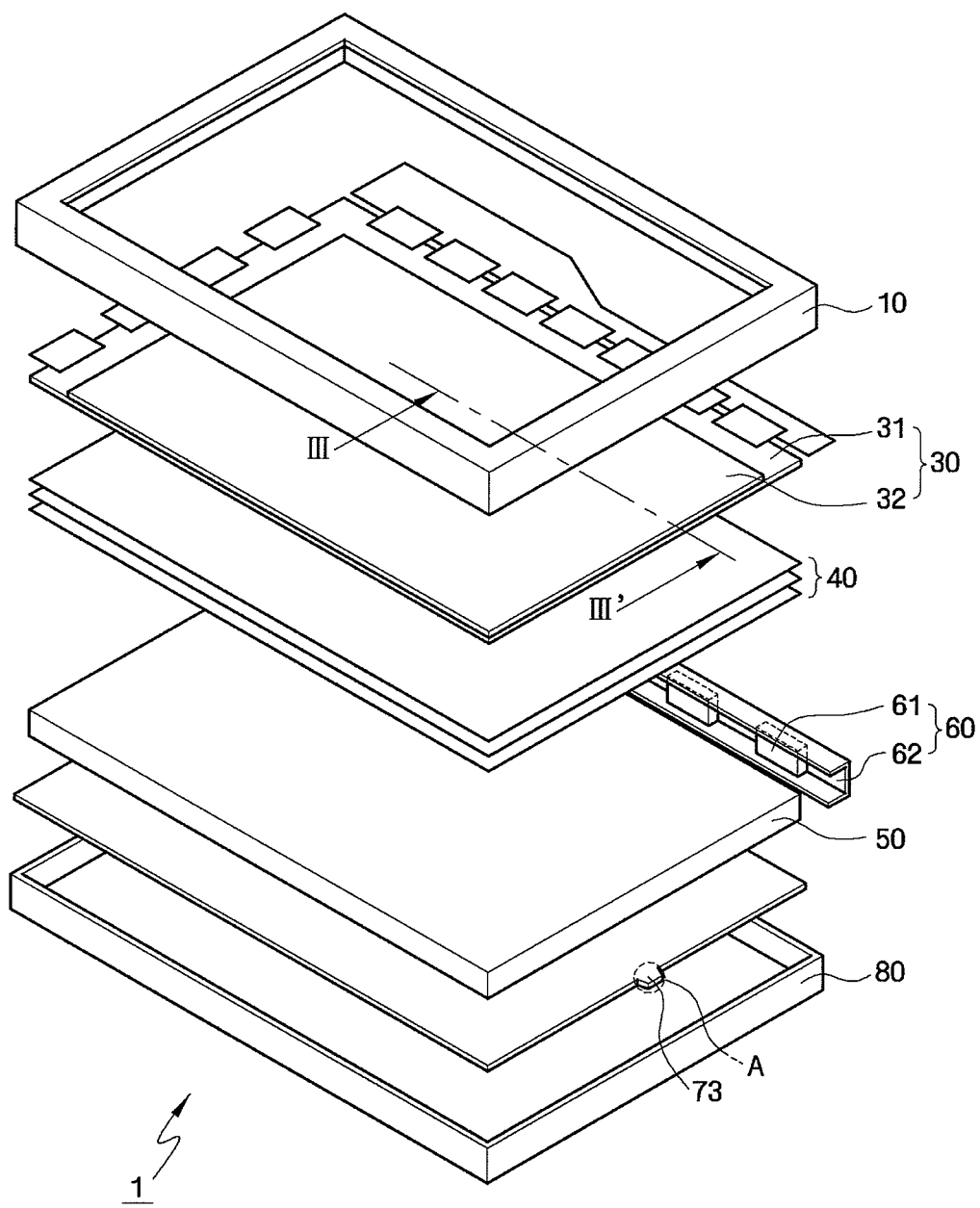
FIG. 1A is an exploded perspective view of a display device according to an embodiment of the present invention.

Hereinafter, exemplary embodiments of the present invention will be described in more detail with reference to the accompanying drawings. However, the present invention may be embodied in many different forms and should not be construed as being limited to the embodiments disclosed herein. The same drawing reference numerals may be used for the same elements across various figures.

Figure 1B:
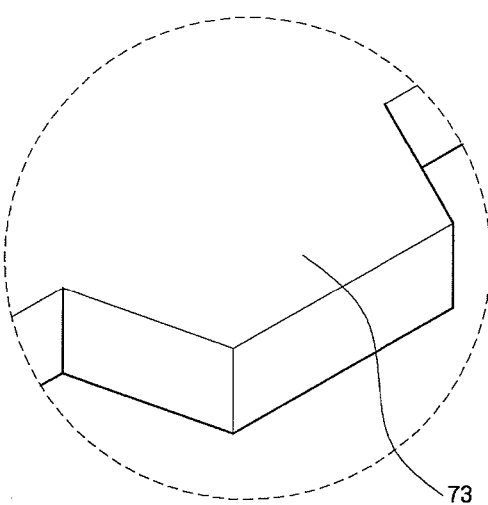
FIG. 1B is an enlarged view of a region A in FIG. 1A.
Figure 2:
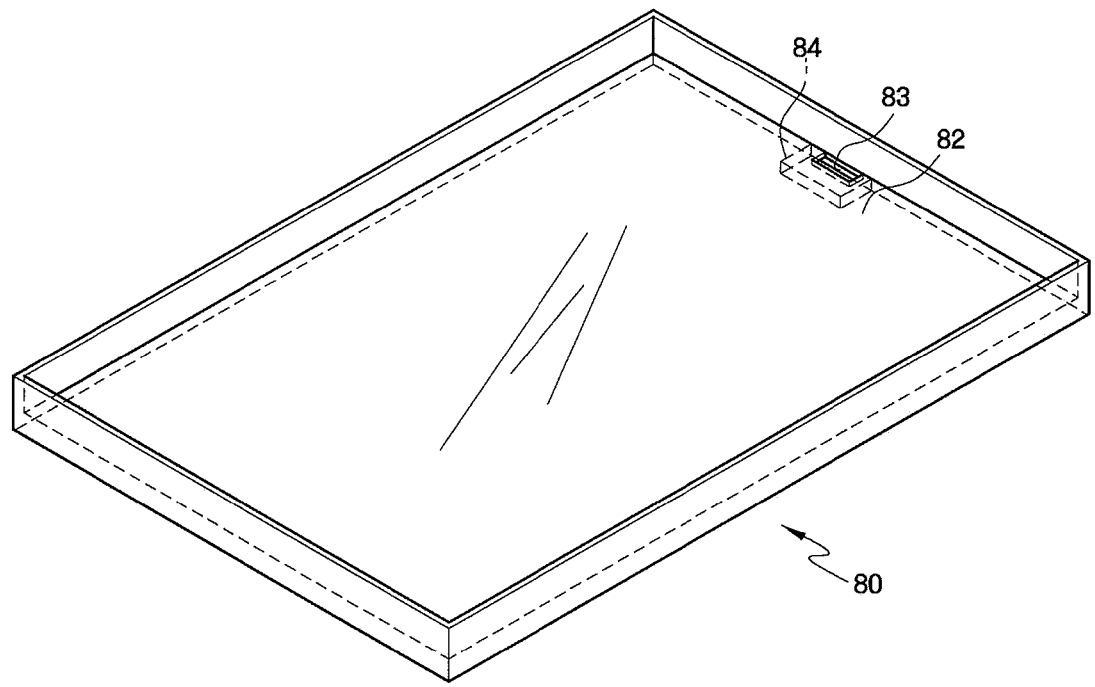
FIG. 2 is a partial perspective view of a lower receptacle included in the display device of FIG. 1A according to an embodiment of the present invention.
Figure 3:
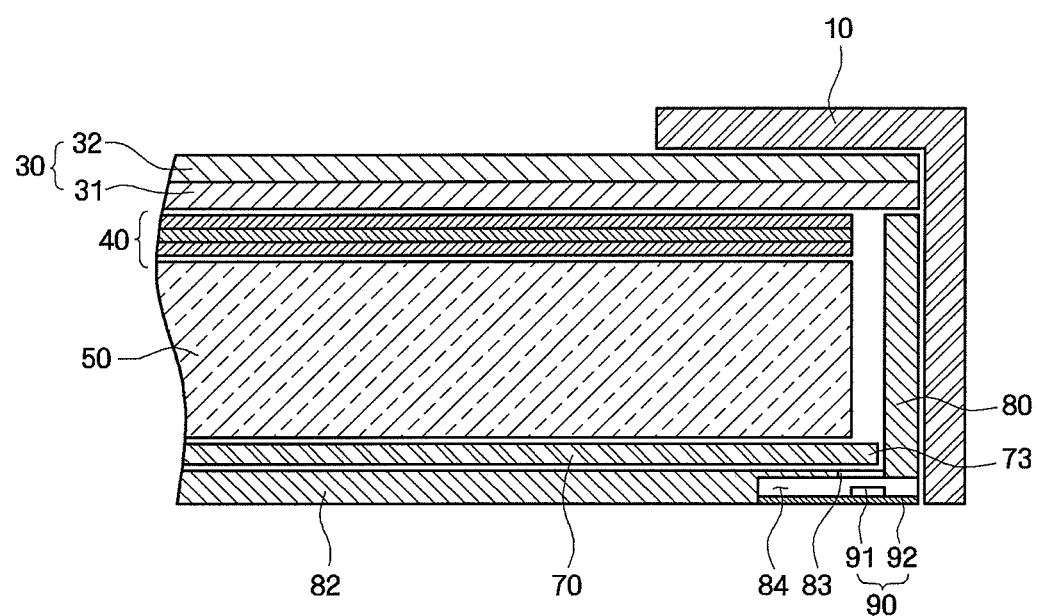
FIG. 3 is a sectional view of the display device, taken along line III-III' of FIG. 1A according to an embodiment of the present invention.

Referring to FIGS. 1 to 3, a display device according to an embodiment of the present invention will be described in further detail. FIG. 1A is an exploded perspective view of a display device according to an embodiment of the present invention, and FIG. 1B is an enlarged view of a region "A" in FIG. 1A. FIG. 2 is a partial perspective view of a lower receptacle included in the display device of FIG. 1A, and FIG. 3 is a sectional view of the display device, taken along line III-III' of FIG. 1A.

Referring to FIGS. 1-3, a display device 1, according to an embodiment of the present invention, includes a display panel assembly, an upper receptacle 10, optical sheets 40, a light guide plate 50, a light source assembly 60, a sensor assembly 90, a reflection sheet 70, an a lower receptacle 80.

The display panel assembly includes a display panel 30 composed of a lower substrate 31, an upper substrate 32, and a liquid crystal layer (not illustrated) interposed between the two substrates.

In the display panel 30, the lower substrate 31 includes gate lines (not illustrated), data lines (not illustrated), a thin film transistor array, and pixel electrodes, and the upper substrate 32 includes black matrices, and common electrodes, and is arranged to face the lower substrate 31. The display panel 30 displays image information.

The upper receptacle 10 forms the exterior of the display device 1, and has a space formed therein to accommodate the display panel 30. In a center part of the upper receptacle 10, an open window exposing the display panel 30 to an outside is formed.

The upper receptacle 10 is coupled to the lower receptacle 80, and the optical sheets 40, the light guide plate 50, and the light source assembly 60 are accommodated in the upper and lower receptacles 10 and 80.

The optical sheets 40, which diffuse and condense the light being transferred from the light guide plate 50, are arranged at an upper part of the light guide plate 50, and may be accommodated in a space surrounded by an intermediate frame. The optical sheets 40 may include a first prism sheet, a second prism sheet, and a diffusion sheet.

The first and second prism sheets improve the brightness of the display device within an effective viewing angle range by concentrating the light incident at a low angle upon the front side of the display panel through refraction of the light having passed through the light guide plate 50.

The diffusion sheet positioned on the lower part of the first and second prism sheets diffuses the light incident from the light guide plate 50 in respective directions so that a bright part and a dark part, which may occur in the light guide plate 50, cannot be seen from the front surface of the display device 1. The construction of the optical sheets 40 is not limited to that as described above, but may be changed in accordance with specifications of the display device 1.

The light guide plate 50 guides the light being supplied from a light source 61 to the display panel 30. The light guide plate 50 may be formed of a panel of a plastic series transparent material such as polymethylmethacrylate (PMMA), and causes the light generated from the light source 61 to propagate to the display panel 30 positioned on the upper part of the light guide plate 50. Accordingly, on the bottom surface of the light guide plate 50, various kinds of patterns (not illustrated) for changing the propagation direction of the light, which is incident to the inside of the light guide plate 50, to the display panel side 30, are printed or formed on the light guide plate 50.

The optical sheets 40 and the light guide plate 50 may be provided as separate constituent elements, or may be integrated into and used as a light guide plate 50 including integrated optical sheets.

The light source assembly 60 generates and provides light to the display panel 30, and includes a light source 61 and a light source cover 62. The light source 61 is positioned on the side of the light guide plate 50, and provides light through the side surface of the light guide plate 50. The light source 61 may be arranged on one side of the light guide plate 50, or may be arranged on more than one side of the light guide plate 50 as needed. The light source 61 may be composed of a light emitting diode (LED). The LED is a point light source, and may be arranged at predetermined intervals along the side surface of the light guide plate 50. The light source 61 includes light emitting chips emitting a red light, a green light, and a blue light, respectively, and may emit the light in the form of a white light through mixing of the red light, the green light, and the blue light. The red light, the green light, and the blue light can be respectively adjusted to emit white light having an optimum color temperature. The term "color temperature" refers to a method of numerically expressing the light from a light source, and is provided by expressing the temperature of a blackbody emitting a visible light as an absolute temperature. In accordance with the color temperature, the color of the light to be seen differs. Accordingly, the color temperature may change the color representation range of an image being displayed through the display panel 30.

When using the LED including the respective light emitting chips emitting the red light, the green light, and the blue light, respectively, the color temperature can be adjusted by adjusting the light emitting chips of the respective colors. Since the range of the color temperature adjustment differs in accordance with various conditions, the adjustment may be made under optimum conditions.

The light source 61 is not limited to an LED, but may be a lamp, such as, for example, a cold cathode fluorescent lamp (CCFL), or a hot cathode fluorescent lamp (HCFL).

The reflection sheet 70 is positioned on the lower part of the light guide plate 50, and reflects the light emitted to the lower part of the light guide plate 50 to the upper part thereof to increase the efficiency of the light. The reflection sheet 70 includes a reflection surface 71 overlapping the lower surface of the light guide plate 50 and an optical adjustment member 73 connected to the reflection surface 71 and projecting beyond an edge of the light guide plate 50. The optical adjustment member 73 may be integrally formed with the reflection sheet 70 and be formed of the same material as the reflection sheet 70, and may be formed with a size that is large enough to overlap the light receiving hole 83 of the lower receptacle 80, as illustrated in FIG. 1B. However, the shape of the optical adjustment member 73 is not limited thereto, but may be formed to lie along the side of the light guide plate 50.

The reflection sheet 70 mainly reflects the light incident toward the reflection sheet 70, but at least a part of the light incident toward the reflection sheet 70 may permeate the reflection sheet 70. In this case, the light that has permeated the reflection sheet 70 may have a luminance lower than that of the light incident toward the reflection sheet 70. Accordingly, the optical adjustment member 73 weakens the light reaching an optical sensor 91 by reducing the luminance of the incident light.

Referring to FIG. 3, the sensor assembly 90 measures the luminance of the light being emitted from the light source 61, and includes the optical sensor 91 and a sensor board 92. The optical sensor 91 can measure the luminance of the red light, the green light, and the blue light, and may be formed of separate photodiodes measuring the red light, the green light, and the blue light, respectively. The optical sensor 91 is attached to the sensor board 92, and is arranged on a bottom surface 82 of the lower receptacle 80.

On the bottom surface 82 of the lower receptacle 80, a sensor insertion groove 84 for receiving the sensor assembly 90 therein is formed. The sensor insertion groove 84 may be formed on an outer side of the bottom surface 82 of the lower receptacle 80 to penetrate inside the bottom surface 82 of the lower receptacle 80. At a top portion of the sensor insertion groove 84, the light receiving hole 83 may be formed to penetrate through an inside surface of the bottom surface 82 of the lower receptacle 80.

The light receiving hole 83 may be positioned so that the light receiving hole does not overlap the light guide plate 50. However, in consideration of the quantity of light reaching the optical sensor, the light receiving hole 83 may be positioned to overlap the light guide plate 50.

The light receiving hole 83 may be formed at an edge of the lower receptacle 80. "the edge" means an area adjacent to side walls of the lower receptacle 80. The area may include an area of contact or separation with the side wall of the lower receptacle 80. The optical sensor 91 of the sensor assembly 90, in order to measure the light incident through the light receiving hole 83, is positioned to overlap the light receiving hole 83. It is not necessary that the light sensor 91 be exposed to the outside through the light receiving hole 83, but the light sensor 91 is formed to receive uniform and sufficient light through the light receiving hole 83.

The light receiving hole 83 may be formed to have an area larger than that of the optical sensor 91. That is, the light receiving hole 83 may be formed to have an area larger than that of the optical sensor 91 to allow the quantity of light incident to the optical sensor 91 to be constant. Accordingly, the optical sensor 91 is completely exposed through the light receiving hole 83. For example, the optical sensor 91 is completely shown through the light receiving hole 83, and the optical sensor 91 completely overlaps the optical adjustment member 73 via the light receiving hole 83.

As described above, by forming the light receiving hole 83 so that the light receiving hole 83 has an area larger than that of the optical sensor 91, the quantity of light incident to the optical sensor 91 is kept constant even if relative positions of the optical sensor 91, the light receiving hole 83, and the optical adjustment member 73 are changed.

The sensor assembly 90 is inserted into the sensor insertion groove 84 so that the optical sensor 91 faces the light receiving hole 83, and is positioned on the bottom surface of the lower receptacle 80. For example, the optical sensor 91 may be on the same plane as the outer side of the bottom surface 82 of the lower receptacle 80.

Figure 4:
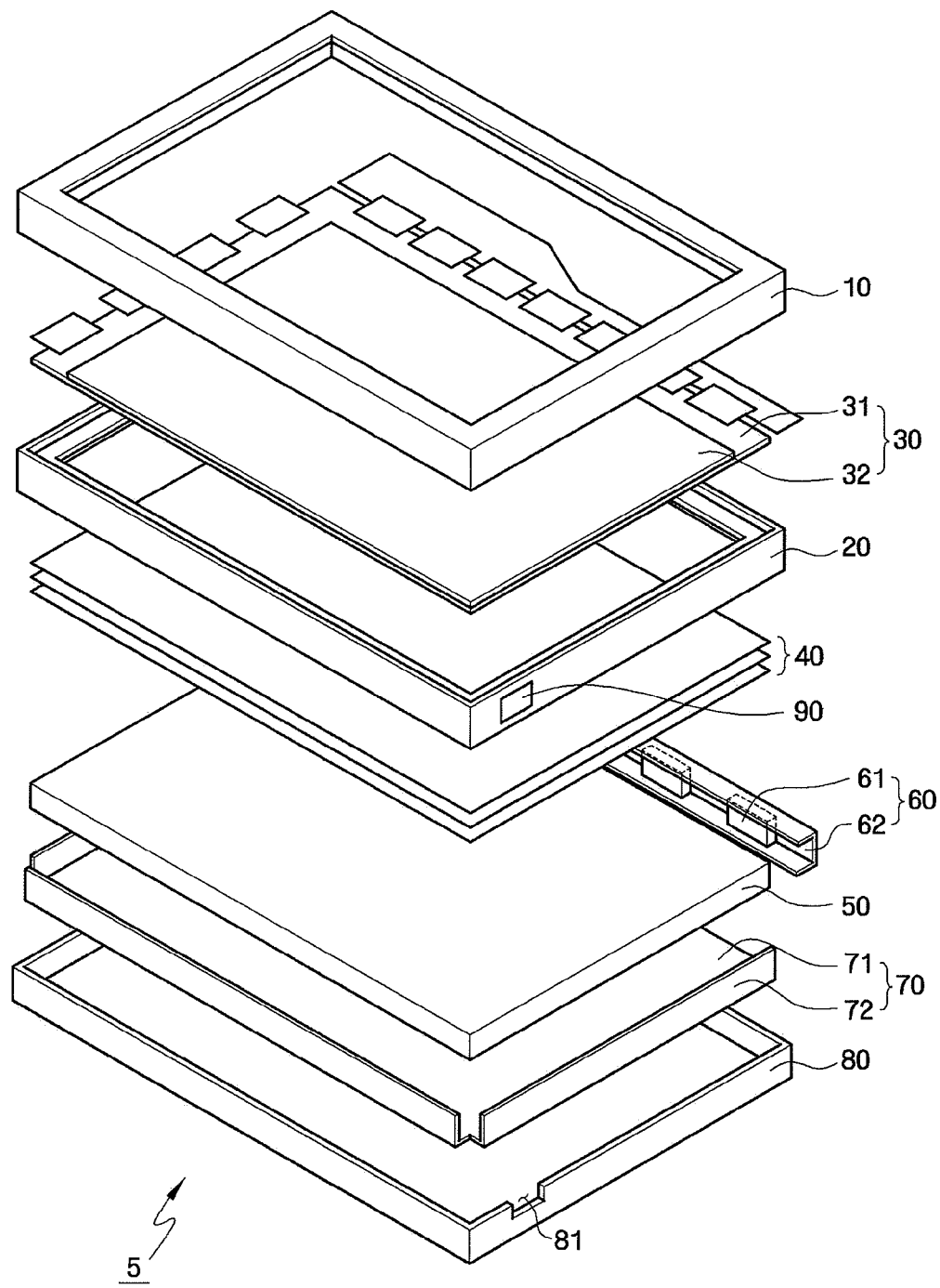
FIG. 4 is an exploded perspective view of a display device according to an embodiment of the present invention.
Figure 5:
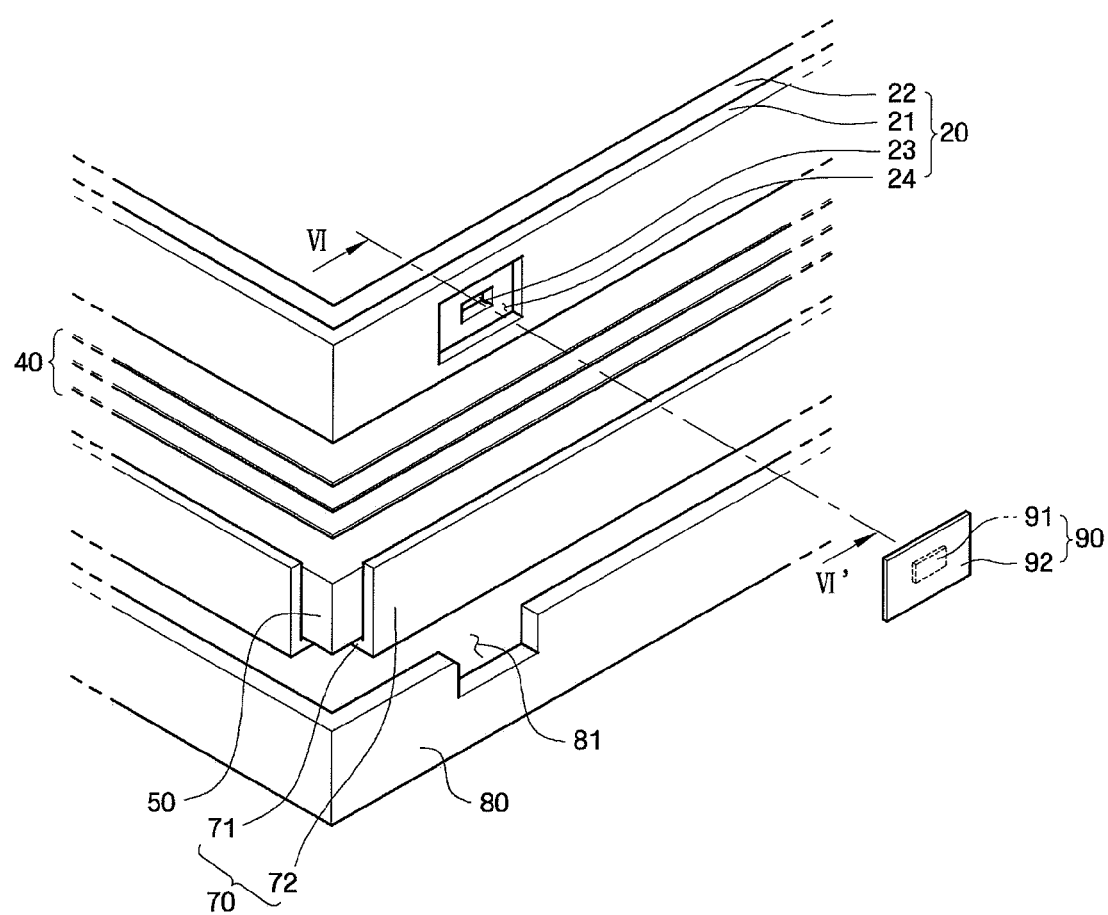
FIG. 5 is a partial enlarged exploded perspective view of the display device of FIG. 4 according to an embodiment of the present invention.
Figure 6:
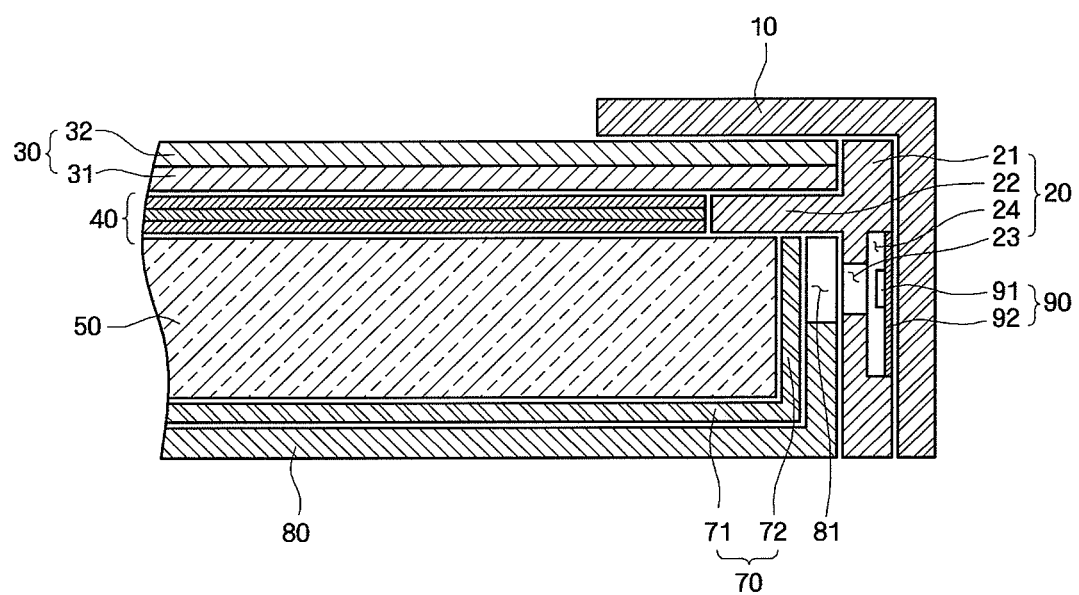
FIG. 6 is a sectional view of the display device, taken along line VI-VI' of FIG. 4 according to an embodiment of the present invention.

Referring to FIGS. 4 to 6, a display device according to an embodiment of the present invention will be described. FIG. 4 is an exploded perspective view of a display device according to an embodiment of the present invention. FIG. 5 is a partial enlarged exploded perspective view of the display device of FIG. 4, and FIG. 6 is a sectional view of the display device, taken along line VI-VI' of FIG. 4.

Referring to FIGS. 4-6, the display device 5 according to an embodiment of the present invention includes a display panel assembly, an upper receptacle 10, an intermediate frame 20, optical sheets 40, a light guide plate 50, a light source assembly 60, a sensor assembly 90, a reflection sheet 70, and a lower receptacle 80.

The upper receptacle 10 is coupled to the lower receptacle 80 through the intermediate frame 20.

The intermediate frame 20 accommodates therein the optical sheets 40, the light guide plate 50, and the light source assembly 60, and is fixed to the lower receptacle 80. The intermediate frame 20 includes side walls 21 formed along the rectangular-shaped edge thereof, and in the center of the intermediate frame 20, an open window is formed to allow transmission of the light that has passed through the light guide plate 50 and the optical sheets 40.

The side walls 21 of the intermediate frame 20 include a reception part 22 extending to the inside of the frame 20. The reception part 22 forms a reception surface to receive the display panel 30 thereon, and the optical sheets 40, the light guide plate 50, and the light source assembly 60 are arranged on the lower surface of the reception part 22.

The optical sheets 40 are arranged on the upper part of the light guide plate 50, and are accommodated in a space surrounded by the reception part 22 and the side walls 21 of the intermediate frame 20. The optical sheets 40 include, for example, a first prism sheet, a second prism sheet, and a diffusion sheet.

The reflection sheet 70 is positioned on the lower part of the light guide plate 50, and reflects the light emitted to the lower part of the light guide plate 50 to the upper part thereof to increase the efficiency of the light. The reflection sheet 70 includes a reflection surface 71 overlapping the lower surface of the light guide plate 50 and a bent part connected to the reflection surface 71 and bent along the side surface of the light guide plate 50. The bent part as described above is not formed on a light-incident surface of the light guide plate 50 on which the light source 61 is positioned, and a part of the bent part that is interposed between the light guide plate 50 and the optical sensor 91 (to be further described herein) is the optical adjustment member 72.

The sensor assembly 90 measures the luminance of the light being emitted from the light source 61, and includes the optical sensor 91 and the sensor board 92. The optical sensor 91 can measure the luminance of the red light, the green light, and the blue light, and may be formed of separate photodiodes measuring the red light, the green light, and the blue light, respectively. The optical sensor 91 is attached to the sensor board 92, and is fixed to the intermediate frame 20.

On the side wall 21 of the intermediate frame 20, a sensor insertion groove 24, for receiving the sensor assembly 90 therein, is formed. The sensor insertion groove 24 may be formed on the outer side of the side wall 21 of the intermediate frame 20 to penetrate to the inside of the side wall 21. A light receiving hole 23 may extend from the sensor insertion groove 24 to penetrate through the inside surface of the side wall 21.

The light receiving hole 23 is formed to extend from the sensor insertion groove 24 to the inside of the intermediate frame 20. The optical sensor 91 of the sensor assembly 90, in order to measure the light incident through the light receiving hole 23, is positioned to overlap the light receiving hole 23. It is not necessary that the light sensor 91 be exposed to the outside through the light receiving hole 23, but the light sensor 91 is positioned to receive uniform and sufficient light through the light receiving hole 23.

The light receiving hole 23 may be formed to have an area larger than that of the optical sensor 91. That is, the light receiving hole 23 may be formed to have an area larger than that of the optical sensor 91 to cause the quantity of light incident to the optical sensor 91 to be constant.

The sensor assembly 90 is inserted into the sensor insertion groove 24 so that the optical sensor 91 faces the light receiving hole 23, and is positioned on an outer side of the side wall 21, for example, the optical sensor 91 is positioned on the same plane as the outer side of the side wall 21 of the intermediate frame 20.

The optical sensor 91 measures the light passing through the optical adjustment member 72. The optical adjustment member 72 is interposed between the light guide plate 50 and the optical sensor 91 to overlap the optical sensor 91, and thus reduces the luminance of the light outputted from the light guide plate 50 to the optical sensor 91.

The lower receptacle 80 is coupled to the intermediate frame 20, and includes the optical sheets 40, the light guide plate 50, the light source assembly 60, and the reflection sheet 70. The lower receptacle 80 may be bent along the light guide plate 50, and the bent surface of the lower receptacle 80 may overlap the side wall 21 of the intermediate frame 20. The lower receptacle 80 may include a cut part 81 formed in a bent surface that overlaps the light receiving hole 23 of the intermediate frame 20 to allow the light incident from the light guide plate 50 to the light receiving hole 23 to pass without obstruction.

Figure 7:
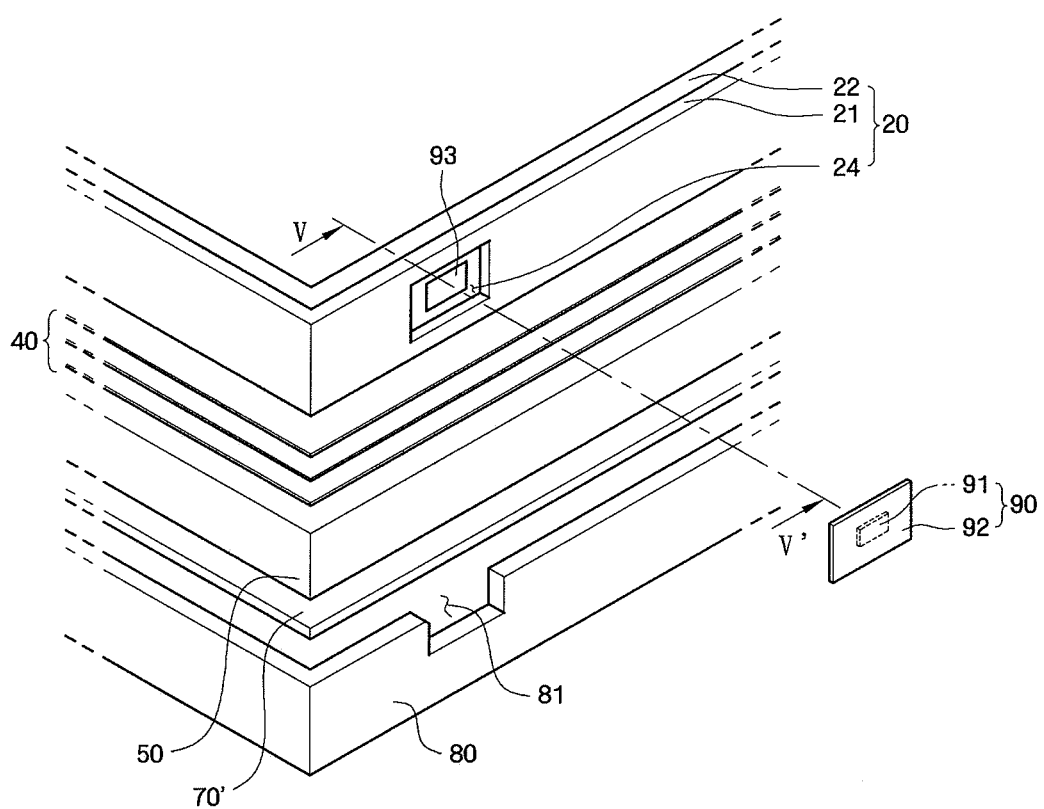
FIG. 7 is a partial exploded perspective view of a display device according to an embodiment of the present invention.
Figure 8:
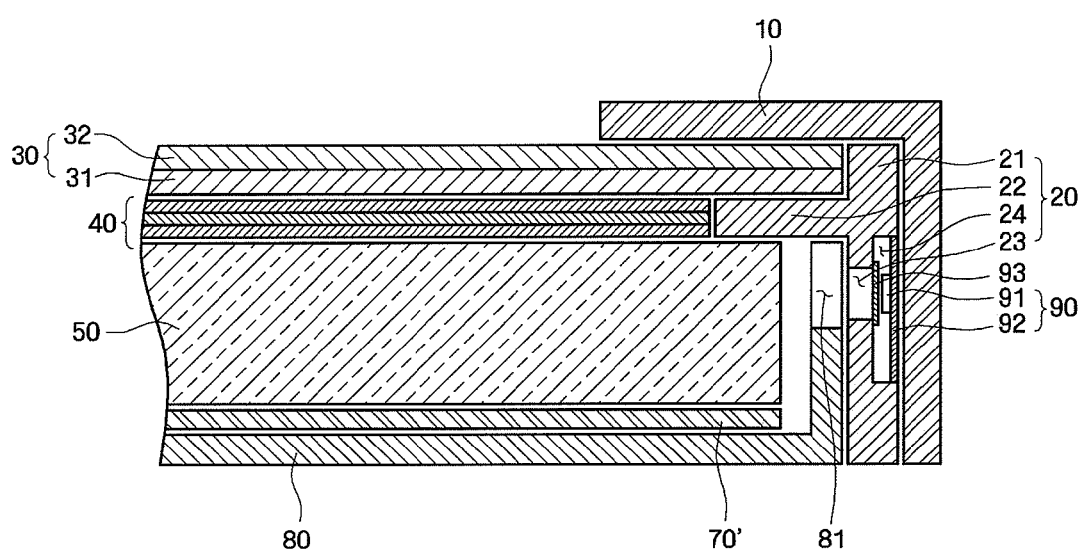
FIG. 8 is a sectional view of the display device, taken along line VIII-VIII' of FIG. 7 according to an embodiment of the present invention.

Referring to FIGS. 7 and 8, a display device according to an embodiment of the present invention will be described. FIG. 7 is a partial exploded perspective view of a display device according to an embodiment of the present invention, and FIG. 8 is a sectional view of the display device, taken along line VIII-VIII' of FIG. 7.

Referring to FIGS. 7 and 8, an optical adjustment member 93 is fixed to a side wall 21 of an intermediate frame 20. The optical adjustment member 93 overlaps the light receiving hole 23 to which the light is incident.

The optical adjustment member 93 may be formed in the sensor insertion groove 24 to overlap the light receiving hole 23, or may be formed to be inserted into the light receiving hole 23.

The optical adjustment member 93 may be formed of the same material as a reflection sheet 70'. That is, a part of a sheet forming the reflection sheet 70' may be cut and then attached to overlap the light receiving hole 23 and form the optical adjustment member.

Alternatively, the optical adjustment member 93 may be made of a material different from the reflection sheet 70' in accordance with the permeation characteristic of a required light. For example, if it is required to adjust the permeation characteristic of a part of red, green, and blue lights in accordance with the conditions of an optical sensor 91, the optical adjustment member 93 may be formed using a proper material.

Figure 9:
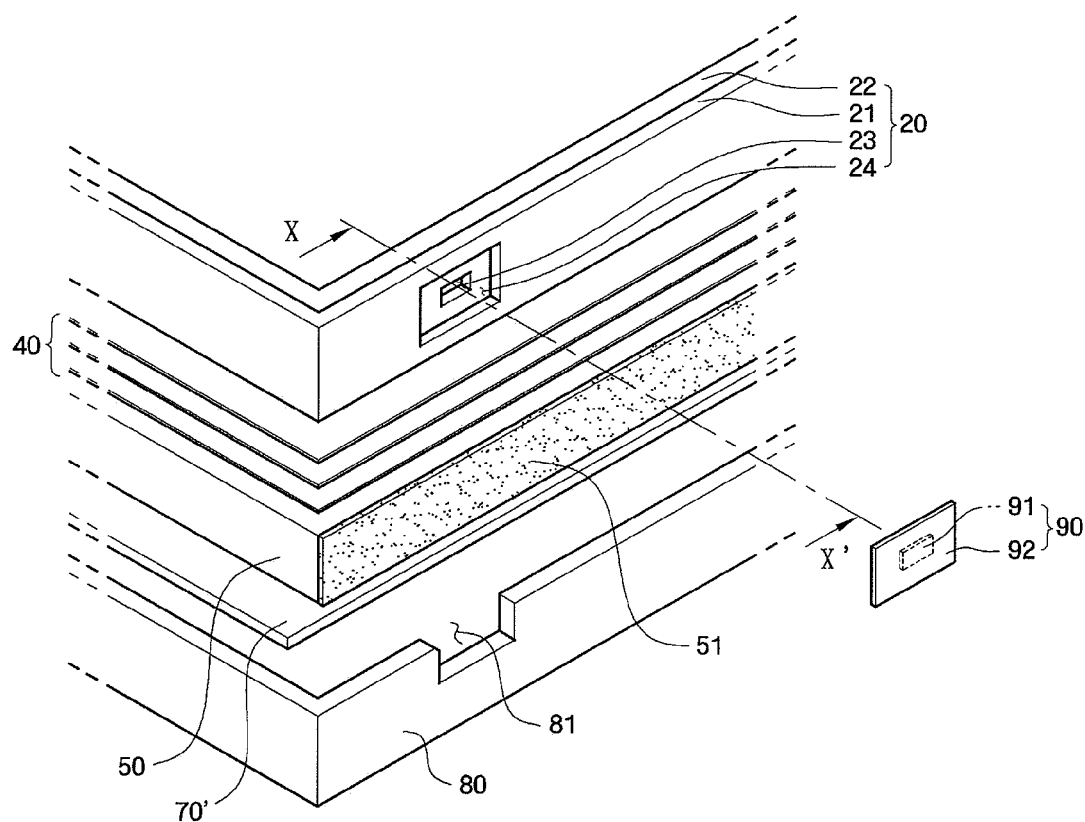
FIG. 9 is a partial exploded perspective view of a display device according to an embodiment of the present invention.
Figure 10:
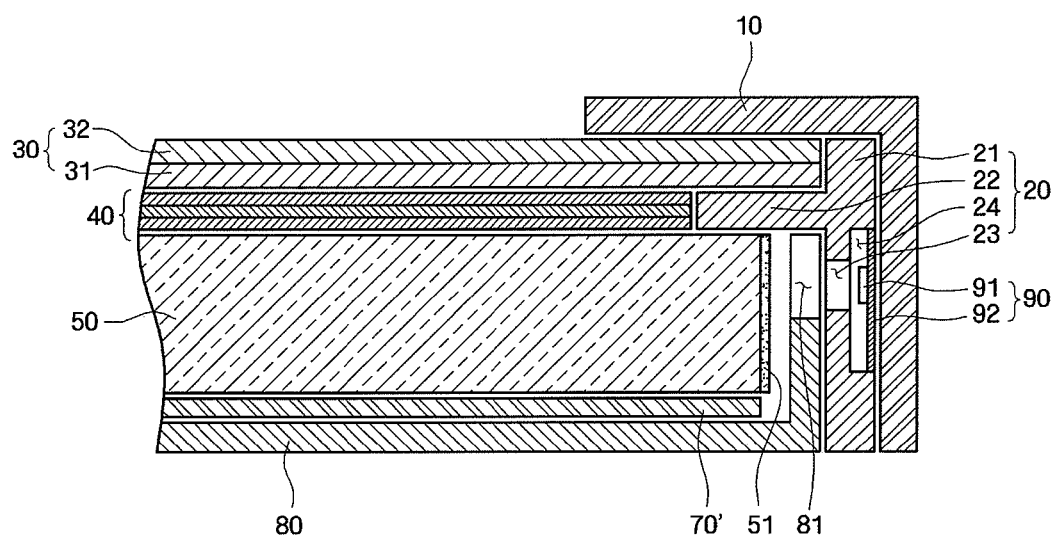
FIG. 10 is a sectional view of the display device, taken along line X-X' of FIG. 9 according to an embodiment of the present invention.

Referring to FIGS. 9 and 10, a display device according to an embodiment of the present invention will be described. FIG. 9 is a partial exploded perspective view of a display device according to an embodiment of the present invention, and FIG. 10 is a sectional view of the display device, taken along line X-X' of FIG. 9.

Referring to FIGS. 9 and 10, an optical adjustment pattern 51 formed on a side surface of the light guide plate 50 forms an optical adjustment member 51. That is, an optical adjustment member is not inserted between the light guide plate 50 and an optical sensor 91 as a separate member, but is formed on the side surface of the light guide plate 50 in the form of a pattern.

The optical adjustment member 51, in order to reduce the luminance of light incident to the optical sensor 91, is formed on the side surface of the light guide plate 50 as a pattern that lowers the permeability of the light. For example, the optical adjustment pattern may be formed by partially spreading a reflective material on the side surface of the light guide plate 50 so that a part of the light, which is output to the side surface of the light guide plate 50, is reflected to the inside of the light guide plate 50. The reflective material may be uniformly spread to overlap the light receiving hole 23. In addition to the reflective material, the optical adjustment pattern may be formed in the form of a scattering pattern for scattering the light, or may be formed from a material that adjusts the permeation characteristic of light having a specified color.

Figure 11:
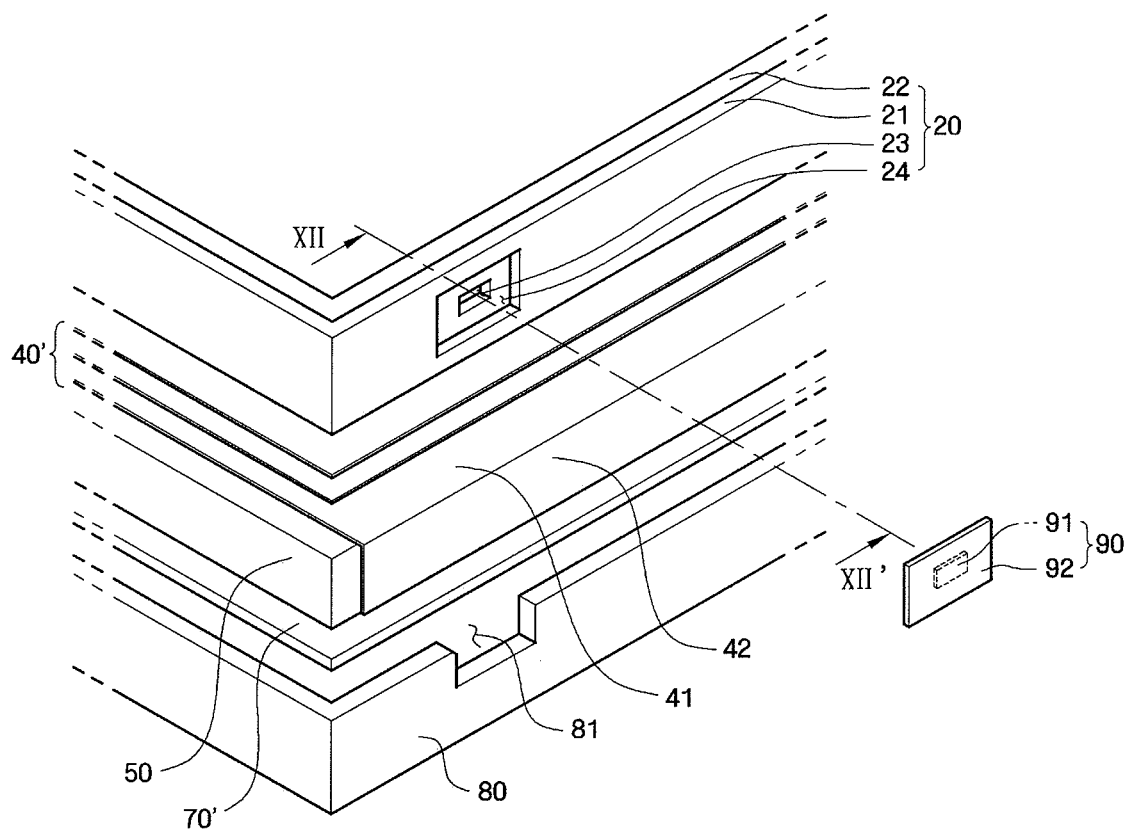
FIG. 11 is a partial exploded perspective view of a display device according to an embodiment of the present invention.
Figure 12:
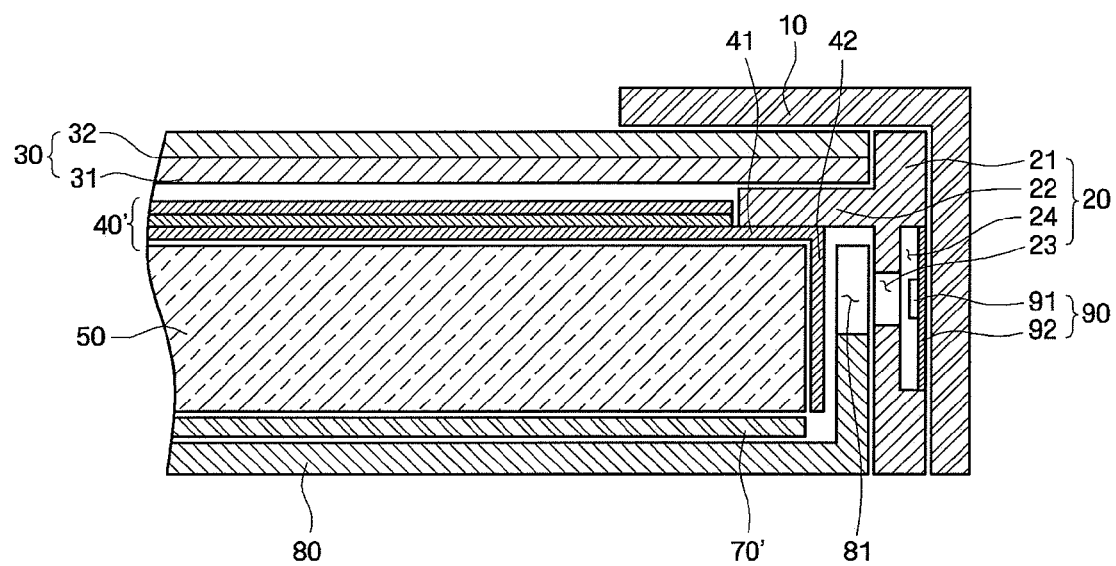
FIG. 12 is a sectional view of the display device, taken along line XII-XII' of FIG. 11 according to an embodiment of the present invention.

Referring to FIGS. 11 and 12, a display device according to an embodiment of the present invention will be described. FIG. 11 is a partial exploded perspective view of a display device according to an embodiment of the present invention, and FIG. 12 is a sectional view of the display device, taken along line XII-XII' of FIG. 11.

Referring to FIGS. 11 and 12, an end part of the optical sheets 40 may form the optical adjustment member 42. For example, one end part of the optical sheets 40, which are interposed between a light guide plate 50 and a display panel 30 to condense or diffuse the light, can be used as the optical adjustment member 42.

The optical adjustment member 42 may be formed in diverse forms to reduce the luminance of the light incident to a light receiving hole 23. The optical sheets 40 include sheets having optical characteristics, such as a prism sheet, and a diffusion sheet. For example, the prism sheet, which functions to condense the light, has the characteristic that, in the case where a parallel light is incident, the prism sheet reflects the incident light with lowered transmissivity. Accordingly, based on this characteristic, it is possible to adjust the luminance of the light incident to the light receiving hole 23.

Also, the diffusion sheet diversifies the output direction of the light that is incident in a specified direction by diffusing the light, and thus can adjustably reduce the quantity of the light incident to the light receiving hole 23. Accordingly, the optical sheets 40 composed of the prism sheets and the diffusion sheet can be used as the optical adjustment member 42 to adjust the luminance of the light incident to the light receiving hole 23.

Figure 13:
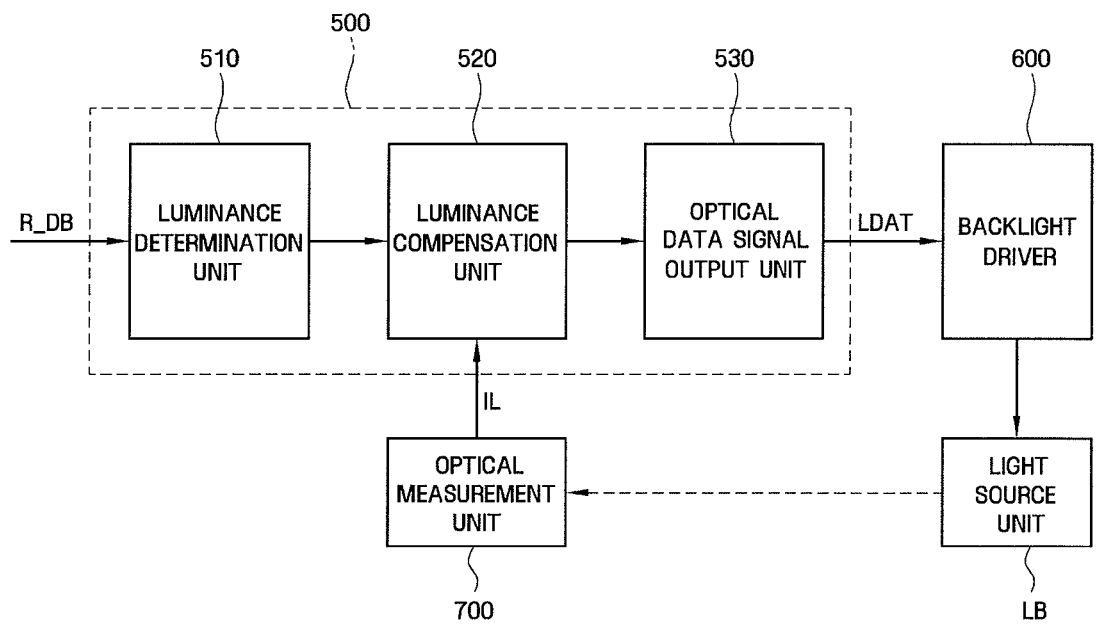
FIG. 13 is a block diagram explaining a control process of an optical source part according to an embodiment of the present invention.

A control process of an optical source part will be described with reference to FIG. 13, which is a block diagram explaining a control process of the optical source part, according to an embodiment of the present invention.

A backlight driver 600 adjusts the luminance of a backlight provided by a light source unit LB in response to an optical data signal LDAT. The luminance of the optical source unit LB may differ in accordance with the duty ratio of the optical data signal LDAT.

The light source unit LB includes at least one light source, and provides light to a display panel 30. The luminance of the light source unit LB can be controlled by a backlight driver 600 connected to the light source unit LB.

An optical measurement unit 700 includes an optical sensor (e.g., optical sensor 91 as described above), measures the luminance of a backlight provided by the light source unit LB, and provides the measured luminance IL of the backlight to an optical data signal control unit 500.

The optical data signal control unit 500 includes a luminance determination unit 510, a luminance compensation unit 520, and an optical data signal output unit 530.

The luminance determination unit 510 receives a representative image signal R_DB, determines the original luminance of the backlight corresponding to the representative image signal R_DB, and outputs the original luminance of the backlight to the luminance compensation unit 520. The luminance determination unit 510, for example, can determine the original luminance of the backlight corresponding to the representative image signal R_DB by using a lookup table (not illustrated).

The luminance compensation unit 520 receives the original luminance of the backlight and the measured luminance IL of the backlight, and provides a compensated luminance to the optical data signal output unit 530. The compensated luminance is a luminance obtained by compensating the original luminance of the backlight so that the measured luminance IL of the backlight becomes a desired value.

Specifically, the luminance compensation unit 520 compares the measured luminance IL of the backlight with the original luminance of the backlight, and if the measured luminance IL of the backlight is smaller than the original luminance of the backlight as a result of comparison, it provides the compensated luminance having a value larger than that of the original luminance of the backlight. For example, if light emitting elements included in the light source unit LB deteriorate, the luminance of the backlight provided by the light source unit LB may have a luminance value that is smaller than a desired luminance value. In this case, the luminance compensation unit 520 provides the compensated luminance having a value larger than the original luminance value of the backlight, and thus the luminance value of the backlight provided by the light source unit LB becomes the desired luminance value. By contrast, if the measured luminance IL of the backlight has a value larger than the original luminance value of the backlight, the luminance compensation unit 520 provides the compensated luminance having a value smaller than the original luminance value of the backlight.

The optical data signal output unit 530 outputs the optical data signal LDAT in accordance with the compensated luminance provided by the luminance compensation unit 520. As described above, by providing the optical data signal LDAT corresponding to the compensated luminance to the backlight driver 600, the luminance of the backlight provided by the light source unit LB can be compensated.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A display device comprising:
a display panel;
a light source generating light;
a light guide plate guiding the light;
a receptacle accommodating the light source and the light guide plate;
a plurality of optical sheets interposed between the display panel and the light guide plate;
an optical sensor fixed to the receptacle;
a light receiving hole formed at an edge of the receptacle, wherein the light receiving hole provides a path through which a portion of the light reaches the optical sensor; and
an optical adjustment member interposed between the light guide plate and the optical sensor, wherein the optical adjustment member reduces luminance of the light incident to the optical sensor;
wherein the optical sensor is exposed to the optical adjustment member through the light receiving hole, wherein the optical adjustment member is integrally formed with a reflection sheet which is accommodated in the receptacle without being a part of the receptacle, and which does not overlap with the optical sheets.

2. The display device of claim 1, wherein the optical sensor is formed on a bottom surface of the receptacle.

3. The display device of claim 2, wherein the optical sensor is not in line with the light guide plate.

4. The display device of claim 1, wherein the optical sensor is positioned on a side wall of the receptacle, and the reflection sheet is bent toward a side surface of the light guide plate to overlap the optical sensor and the side surface of the light guide plate.

5. The display device of claim 1, wherein the reflection sheet transmits at least a part of the incident light.

6. The display device of claim 1, wherein the optical adjustment member is projected beyond an edge of the light guide plate so as not to be in line with the light guide plate.

7. The display device of claim 1, wherein the light source is arranged on a side of the light guide plate, and the optical sensor is arranged on another side of the light guide plate where the light source is not arranged.

8. The display device of claim 1, wherein the optical adjustment member is an optical adjustment pattern formed on a side surface of the light guide plate.

9. The display device of claim 8, wherein the side surface of the light guide plate is a surface where the light source is not arranged.

10. The display device of claim 1, wherein the light source comprises red, green, and blue light-emitting diodes.

11. The display device of claim 1, wherein the receptacle comprises a side wall surrounding the light guide plate, and the light receiving hole is formed in the side wall.

12. The display device of claim 11, wherein the side wall includes a groove into which the optical sensor is inserted.

13. A display device comprising:
a display panel;
a light source;
a light guide plate;
a plurality of optical sheets interposed between the display panel and the light guide plate;
a frame surrounding at least part of the light guide plate;
an optical sensor positioned in a groove formed in the frame;
a light receiving hole formed in the frame, wherein the light receiving hole provides a path through which light from the light guide plate reaches the optical sensor; and an optical adjustment member interposed between the light guide plate and the optical sensor; wherein the optical sensor is exposed to the optical adjustment member through the light receiving hole, wherein the optical adjustment member is integrally formed with a reflection sheet which is accommodated in the frame without being a part of the frame, and which does not overlap with the optical sheets.

14. The display device of claim 13, wherein the groove is formed in a bottom surface of the frame.

* * * * *